United States Patent
McCullough (12) United States Patent (10) Patent No.: US 7,054,618 B1
McCullough (45) Date of Patent: May 30, 2006

(54) METHOD OF REGISTERING A COMMUNICATION DEVICE WITH A PROXY SERVER BASED SERVICE

(75) Inventor: Trevor McCullough, Newtownards (IE)

(73) Assignee: Openwave Systems Inc., Redwood City, CA (US)

( * ) Notice: Subject to any disclaimer, the term of this patent is extended or adjusted under 35 U.S.C. 154(b) by 486 days.

(21) Appl. No.: 10/155,414

(22) Filed: May 23, 2002

(51) Int. Cl.
  *H04M 11/10* (2006.01)
  *H04Q 7/20* (2006.01)

(52) U.S. Cl. .................. 455/414.1; 455/435.1

(58) Field of Classification Search ............ 455/414.1, 455/414.2, 435.1, 456.1, 422.1; 709/227, 709/229; 370/901, 908, 912
See application file for complete search history.

(56) References Cited

U.S. PATENT DOCUMENTS

| 6,088,594 | A * | 7/2000 | Kingdon et al. ............ 455/457 |
| 6,275,693 | B1 | 8/2001 | Lin et al. |
| 6,418,138 | B1 * | 7/2002 | Cerf et al. ................ 370/352 |
| 6,542,933 | B1 * | 4/2003 | Durst et al. ............... 709/229 |
| 6,590,588 | B1 | 7/2003 | Lincke et al. |
| 6,678,731 | B1 | 1/2004 | Howard et al. |
| 6,754,707 | B1 * | 6/2004 | Richards et al. ............ 709/227 |
| 6,775,536 | B1 | 8/2004 | Geiger et al. |

FOREIGN PATENT DOCUMENTS

| FR | 2799594 A1 | 4/2001 |
| GB | 2353919 A | 3/2001 |
| WO | WO 00/02358 A1 | 1/2000 |

OTHER PUBLICATIONS

Armando Fox et al.. "Security on the Move: Indirect Authentication Using Kerberos," 1996, pp. 155-164, MOBICOM 96, Rye, New York.

* cited by examiner

*Primary Examiner*—Quochien B. Vuong
(74) *Attorney, Agent, or Firm*—Blakely, Sokoloff, Taylor & Zafman LLP (57) ABSTRACT

The invention provides a method of registering a communication device with a proxy based service. In one embodiment a request is received from a communication device at a proxy server device, where the communication device is transmitting a request to access an on-line service. The proxy server determines whether additional information from a proxy based service is required. Also, the proxy server recognizes if future requests will require the additional information from the proxy based service. If future requests require the proxy based service, then the proxy server will register the communication device with the proxy based service.

18 Claims, 10 Drawing Sheets

METHOD OF REGISTERING A COMMUNICATION DEVICE WITH A PROXY SERVER BASED SERVICE

FIELD OF THE INVENTION

The field of the invention relates to communications over a network. In particular it relates to registering a wireless communication device with a proxy based service on a network.

BACKGROUND

Mobile communication devices, such as mobile telephones, two-way pagers, Personal Digital Assistant (PDAs), Personal Information Mangers (PIMs), and other hand-held computing devices have become very popular. In many cases these mobile communication devices are used as entry points into the internet and intranets.

A problem common to many conventional mobile communication devices is that these devices are characterized by severe limitations in processing power, memory size, display size and the size of the buttons or keys by which a user can input requests to view and manipulate information obtained from a network server. Furthermore, the bandwidth of the communications channels connecting these mobile devices to a network server, e.g., a hypermedia server on the internet, is limited.

One attempt to overcome these limitations of current mobile devices is to make use of a proxy server to facilitate communications between the various communication devices and a networks server, the role of the proxy server being to provide an interface between the wireless telecommunications network on which the communication devices operate and the (wired) computer network on which the network server operates. The proxy server may also be used to provide value added services to the mobile communication devices. The proxy servers are implemented as network server devices having hardware and software components which allow the proxy server to provide services to the mobile communication devices. For example, a proxy server can be used to provide bookmarks, cookie caches, implementation of privacy agreements, sub-id translations, location information, presence information, etc. to a mobile communication device. However, in order for the proxy server to provide these services, it is necessary for the proxy server to be able to access communications or requests from the mobile communication device to the network server and specifically, to have knowledge of the content of such requests.

It is desirable to provide end-to-end secure communications between the communication device and the network server, for various reasons. In the case of true end-to-end secure communications between the communication device and the network server, all requests are encrypted and tunneled through the proxy server. Alternatively, a secure connection may be achieved by bypassing the proxy server entirely. In both of these scenarios, when a true end-to-end secure connection is established between the mobile communication device and the network server, the proxy server will not have knowledge of the content of requests by the mobile communication device to the network server.

Consequently the proxy server will not be able to provide value-added services, such as those mentioned above, to the mobile communication device.

SUMMARY OF THE INVENTION

In one embodiment the invention is a method for automatically registering a communication device with a proxy server based service. The method includes receiving a request from a communication device at a network server device, the request requesting access to an on-line service provided by the network server device. The method also includes determining that the request from the communication device requires additional information from a proxy based service. The method also includes recognizing that a future request will require the additional information from the proxy based service. The method further includes transmitting a request from the network server device to a proxy server device, the request requesting the required additional information and requesting that the communication device be registered with the proxy based service. Moreover, the method includes registering the communication device with the requested proxy based service in response to the network servers request therefor.

In an alternate embodiment, the invention is also a method for automatically registering a communication device with a proxy based service. The method includes receiving a request from a communication device at a network server device. The method also includes the request requesting access to an on-line service provided by the network server device. The method also includes determining that the request from the communication device requires additional information from a proxy based service. The method also includes recognizing that a future request will require the additional information from the proxy based service. In addition, the method includes transmitting a response from the network server device to the communication device, the response including a request for the required additional information and the response notifying the communication device that future requests for the on-line service will require the additional information provided by the proxy based service. The method further includes transmitting a request from the communication device to the proxy based service, the request including a request for the required additional information and the request including a request to register the communication device with the proxy based service. Moreover, the method includes registering the communication device with the requested proxy based service in response to the communication device's request therefor.

The invention is also a method for requesting a communication device's permission to register the communication device with a proxy server based service. The method includes receiving a request from a network server device at a proxy server device, the request requesting that a communication device be registered with a proxy based service. The method also includes determining that permission to register the communication device with the proxy based service is required. The method further includes requesting permission from the communication device to register the communication device with the proxy based service. Moreover, the method includes registering the communication device with the requested proxy based service in response to a positive reply from the communication device.

The invention is also a method for unregistering a communication device from a proxy server based service. The method includes receiving a request from a communication device at a network server device, the request requesting access to an on-line service provided by the network server device. The method also includes recognizing that the request includes additional information obtained from a proxy based service at a proxy server. The method also includes determining that the additional information is not required in this request. The method also includes determining that the communication device be unregistered from the proxy based service. The method further includes transmitting a request from the network server to the proxy server, the request requesting that the communication device be unregistered from the proxy based service. Moreover, the method includes unregistering the communication device from the proxy based service.

In an alternative embodiment the invention is also a method for unregistering a communication device from a proxy server based service. The method includes receiving a request from a communication device at a network server device, the request requesting access to an on-line service provided by the network server device. The method also includes recognizing that the request includes additional information obtained from a proxy based service. The method also includes determining that the additional information is not required in this request. The method also includes determining that the communication device should be unregistered from the proxy based service. In addition, the method includes notifying the communication device that the communication device should be unregistered from the proxy based service. The method further includes transmitting a request from the communication device to the proxy server, the request requesting that the communication device be unregistered from the proxy based service. Moreover, the method includes unregistering the communication device from the proxy based service.

BRIEF DESCRIPTION OF THE DRAWINGS

The present invention is illustrated by way of example, and not limitation, in the figures of the accompanying drawings, in which.

DETAILED DESCRIPTION

An advantage of the present invention is the ability to register mobile telephone 150 with a proxy based service. Previously requests from a mobile telephone 150 were not registered with a required proxy based service. Requests were simply forwarded to a network server 114. If the network server 114 determined that a additional information from a proxy based service was required to service the request, then an error message was generated at the network server 114. The error message was sent to the mobile telephone 150 and then forwarded back to the proxy server 106 where the required proxy based service was applied. Then, the request would be sent for a second time to the network server 114. Thus, without the present invention two requests are necessary to access an on-line service where additional information is required from a proxy-based service. On the other hand, utilizing the present invention, the network server 114 may register the mobile telephone 150 with the proxy service after an initial request. Thereafter, only one request for the service is required.

Reference in the specification to "one embodiment" or "an embodiment" means that a particular feature, structure, or characteristic described in connection with the embodiment is included in at least one embodiment of the invention. The appearances of the phrase "an embodiment, "in one embodiment", or other similar phrases in various places in the specification are not necessarily all referring to the same embodiment, nor are separate or alternative embodiments mutually exclusive of other embodiments.

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Described herein is a method of registering a communication device with a proxy based service. The method includes receiving a request from a communication device at a proxy server device, where the communication device is transmitting a request to access an on-line service. The method also includes determining that the request from the communication device requires additional information from a proxy based service at the proxy server device before the request is to be transmitted to the network server at which the requested on-line service is provided. The method further includes recognizing that future requests will require the additional information from the proxy based service. Moreover, the method includes registering the communication device with the proxy based service.

A method for unregistering the proxy based service from the communication device is also described. The method includes receiving a request from a communication device at a proxy server device, where the communication device is transmitting a request to access an on-line service provided by a network server. The method also includes determining that the request from the communication device includes a request to unregister the communication device from a proxy based service. The method further includes unregistering the communication device from the proxy based service.

Figure 1:
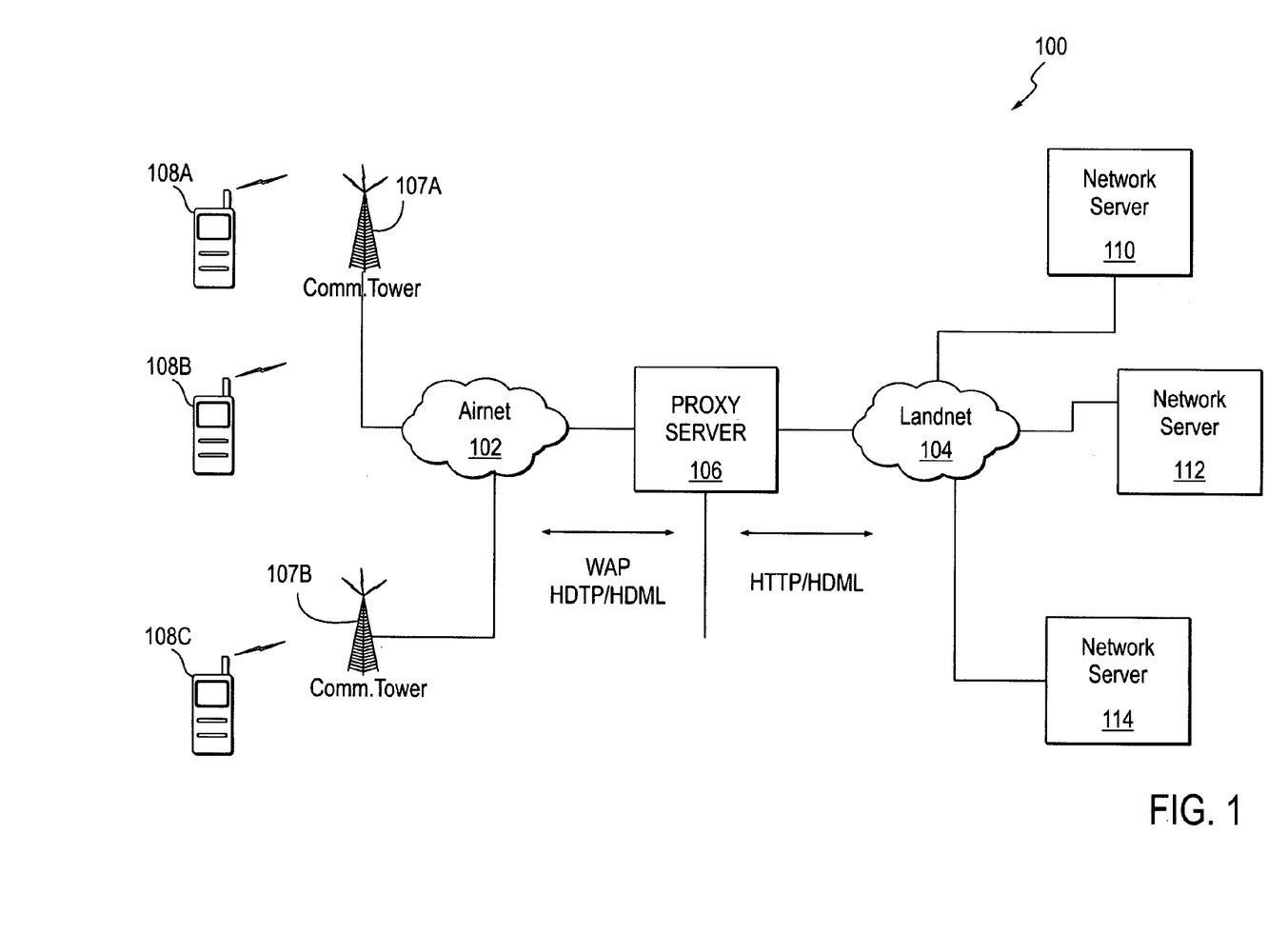
FIG. 1 illustrates a network environment in which the present invention may be practiced.

FIG. 1 shows an example of a network environment 100 in which various embodiments of the present invention may be practiced. Network environment 100 includes a wireless telecommunications network or airnet 102 that is coupled to a land based computer network or landnet 104 via a proxy server 106.

Landnet 104 may be or may include the Internet, an intranet or a data network such as a Local Area Network (LAN), or a combination thereof. The communications protocol supporting landnet 104 may be, for example, Transmission Control Protocol (TCP/IP), Hand-Held Transfer Protocol (HTTP), or secure HTTP (sHTTP).

Airnet 102 may, for example, be a network such as a Mobile Digital Packet Data (MDPD) network, a Global System for Mobile communications (GSM) network, a Code Division Multiple Access (CDMA) network, or a Time Division Multiple Access Network (TDMA) network. The communications protocol used by the airnet 102 may include, for example, Wireless Application Protocol (WAP) and/or Hand-Held Device Protocol (HDTP). Components of the airnet 102 include transceiver base stations 107A and 107B, each of which facilitate wireless communications within its respective cell. As shown, mobile communication devices 108A, 108B, and 108C may operate within the area served by airnet 102.

Airnet 102 connects to landnet 104 via proxy server 106. Proxy server 106 serves to convert communications as they pass between airnet 102 and landnet 104 and thus functions as a gateway server. Coupled to the landnet 104 are network servers 110, 112, and 114, each of which supports communications with landnet 104. Each of the mobile communication devices 108A, 108B and 108C, are configured to retrieve remotely stored hypermedia information such as Wireless Mark-Up Language (WML) documents, Hypertext Mark-up Language (HTML) documents, Compact HTML (CHTML) documents, Extensible Mark-up Language (XML) documents, or Hand-Held Device Mark-up Language (HDML) documents from the network servers 110, 112, and 114.

Proxy server 106 supports communications according to HTTP on the landnet 104 side and communication according to HDTP and/or WAP on the airnet 102 side. Proxy server 106 also has software and/or hardware to provide various services to mobile communication devices 108A, 108B, and 108C, as will be described in greater detail below. Also, proxy server 106 has software and/or hardware to provide for communication devices 108A, 108B, and 108C, registration and unregistration with the various services.

Each network server 110, 112, and 114 may be a conventional network server having specialized software to carry out the methodology of the present invention, as will be described in greater detail below. In one embodiment, when landnet 104 is the internet, each network server 110, 112, and 114 may be implemented as a web server storing hypermedia information such as HTML documents.

The mobile communication devices 108A, 108B, and 108C may be mobile telephones, 2-way pagers, Personal Digital Assistants, (PDAs), Personal Information Managers (PIMs), or any other hand-held computing device. For purpose of this description, it will be assumed that each of the mobile computing devices 108A, 108B, and 108C is a mobile telephone. An embodiment 150 of a mobile telephone that may be used to practice the present invention is described with reference to FIG. 5.

As discussed above, mobile telephone 150 has severe limitations in terms of processing power, memory size, display size, and the size of the buttons or keys by which a user can request, view, and manipulate information, such as hypermedia information stored on, for example, network server 114. These limitations, can be overcome in the prior art by using a proxy server to provide services to mobile telephone 150.

One example of such a service is a "bookmark" or "favorites" service. Conventional web browsers are able to access lists of frequently used hypermedia links, e.g. URLs, which are stored in memory. However, because of its limited storage capability, the mobile telephone 150 has insufficient storage to store such a list of frequently used hypermedia links. This severely reduces the usefulness of mobile telephone 150 for the purpose of, for example, browsing the world-wide-web. This limitation is overcome by providing a bookmark service, resident in the proxy server, which allows a user of mobile telephone 150 to store and access a list of frequently used hypermedia links in a memory device resident in the proxy server 106.

Another example of a service which a proxy server may provide to mobile telephone 150 is a "location" service. There are many web-based applications that require specific information relating to the location of a mobile communication device. For example, network server 114 may be used to provide location or map information to mobile telephone 150. In order to do this the exact location of the mobile telephone 150 must be sent to the network server 114. A proxy server may be used to provide the exact location of mobile telephone 150 to a network server 114. In practice, a communication from the mobile telephone 150 requesting map information from network server 114 is first sent to the proxy server 106. The proxy server 106 has specialized software, which is able to determine that the communication from mobile telephone 150 requires the location of mobile telephone 150 in order for network server 114 to provide the necessary information to mobile telephone 150. In response to a determination that location information is required, the proxy server is able to determine the location of mobile telephone 150 either by calculating the location itself or by accessing a remote server in order to provide this information. The proxy server thereafter enhances the communication from mobile telephone 150 by adding the location information thereto before forwarding the enhanced communications to network server 114 for processing.

However, as previously noted, it may be desirable to have an end-to-end secure connection between the mobile telephone 150 and the network server 114. In order to facilitate discussion of the invention, it is assumed that a user of mobile telephone 150 wishes to communicate with network server 114 via a secure end-to-end connection. Such a connection may be achieved by encrypting communications from mobile telephone 150 and tunneling it through proxy server 106. Alternatively, proxy server 106 may be bypassed entirely by routing the communications to another gateway server. The particular method used to achieve the end-to-end secure connection is not germane to the invention.

It will be appreciated that as a result of the secure end-to-end connection between mobile telephone 150 and network server 114, proxy server 106 is unable to access, and therefore enhance in the manner described above, a communication request from mobile telephone 150 to network server 114. For the same reason, proxy server 106 is unable to provide services, e.g. a bookmark service to mobile telephone 150.

In one possible approach, a solution to this problem was provided by allowing a proxy server to access communications or requests from a mobile telephone to a network server even in the presence of an end-to-end secure connection. The present invention improves on this by allowing proxy server 106 to register or unregister mobile telephone 150 with a proxy based service in response to requests from network server 114. In an alternate embodiment, requests to register or unregister mobile telephone 150 with the proxy based service are made by mobile telephone. In a further alternative embodiment, a request from network server 106 to register or unregister mobile telephone 150 with a proxy based service requires proxy server 106 to receive permission from mobile telephone 150 before taking such action.

Figure 2:
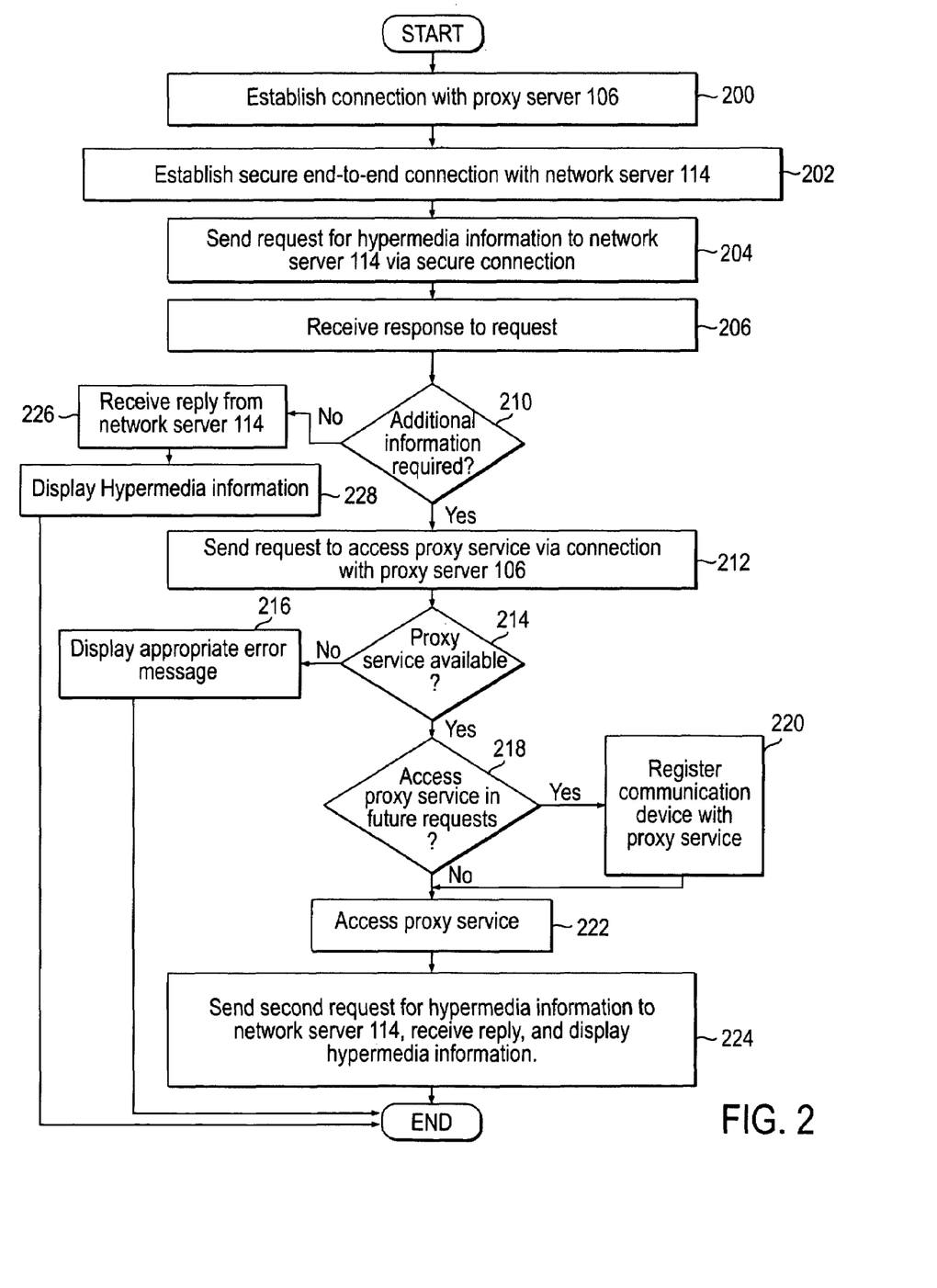
FIG. 2 illustrates an embodiment of a method performed by a communication device in a communication between the device and a network server, in accordance with an embodiment of the invention.

FIG. 2 shows a flowchart illustrating various operations in a communication between mobile telephone 150 and network server 114 in accordance with one aspect of the invention. At block 200, mobile telephone 150 establishes a connection with proxy server 106. This connection may be established using, for example, the HTTP or sHTTP protocols. At block 202, mobile telephone 150 establishes a secure end-to-end connection with network server 114. This secure end-to-end connection may be achieved using the TCP/IP protocol and tunneling through proxy server 106. At the end of block 202, mobile telephone 150 has two open sessions viz, a secure end-to-end session with network server 114 and either a secure or non-secure session with proxy server 106. At block 204 mobile telephone 150 sends a request for hypermedia information to network server 114 via the secure connection therewith. At block 210 the network server 114 analyzes the request for hypermedia information from an online service. The network server 114 determines whether the request requires information unavailable at the mobile telephone 150. Certain online services require mobile telephone 150 to obtain additional information from a proxy based service before network server 114 can service the request. Network server 114 stores a list of online services requested by mobile telephone 150 requiring proxy based information. If no additional information is required, network server 114 sends mobile telephone 150 the hypermedia information. At block 228 mobile telephone 150 displays the hypermedia information received from network server 114.

If additional information is required, for example location information to access a "location" service as described, then network server 114 sends a request to proxy server 106 to access the appropriate proxy service at block 212. In an alternate embodiment, communication device 150 sends a request to proxy server 106 to access the appropriate proxy service at block 212. This request is sent via the connection established between the network server 114 and proxy server 106. In one embodiment the connection is a direct connection between network server 114 and proxy server 106. In an alternative embodiment, network server 114 and proxy server 106 are connected via mobile telephone 150. At block 214 proxy server 106 determines if the requested proxy service is available. If the proxy service is not available, proxy server 106 sends an error message to mobile telephone 150.

If the proxy service is available, at block 218 proxy server 106 analyzes the request to determine if it should register mobile telephone 150 with the proxy service provided in block 212. Registration will be required if the request includes registration data supporting that action. If registration with the proxy service is required, then proxy server 106 at block 220 registers mobile telephone 150 with the proxy service. The registration data may provide the type of proxy service required and an indication that registration with the proxy service is required. In alternate embodiments the registration data may indicate the time period for which the mobile telephone 150 is required to be registered with the proxy service.

At block 222 proxy server 106 accesses the proxy service and obtains the additional information. The proxy server 106 sends mobile telephone 150 the additional information and mobile telephone sends a second request for the hypermedia information to network server 114 via the secure end-to-end connection at block 224. In an alternative embodiment, proxy server 106 sends network server 114 the additional information. At block 226, mobile telephone 150 receives a reply to the second request from network server 114 and at block 228 mobile telephone 150 displays the hypermedia information.

Figure 3:
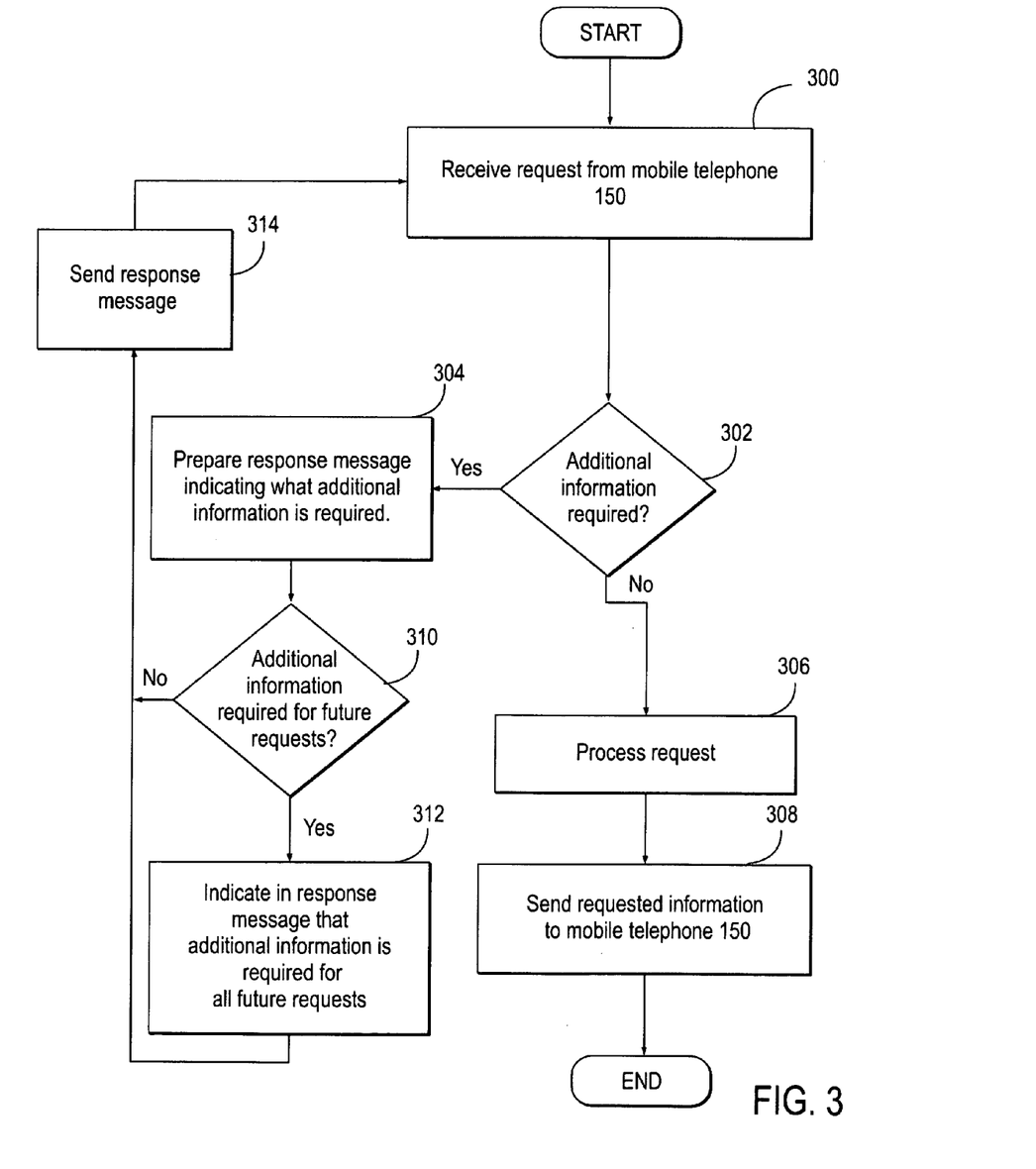
FIG. 3 illustrates an embodiment of a method performed by a network server in order to service a request by a communication device, in accordance with an embodiment of the invention.

FIG. 3 illustrates an embodiment of a method performed by a network server in order to service a request by a communication device, in accordance with an embodiment of the invention. Referring to FIG. 3, at block 300 network server 114 receives a request for information from mobile telephone 150. At block 302 a determination is made as to whether additional information, for example the location of the mobile telephone 150, is needed from mobile telephone 150 in order to service the request. If it is determined that no additional information is required then at block 306 network server 114 processes the request and at block 308 the result of said processing is sent to mobile telephone 150. On the other hand, if it is determined that additional information is required in order to service the request, then at block 304 a response message indicating the type of information required, is prepared. At block 310 a determination is made as to whether the additional information will be required for future requests. If it is determined that the additional information will not be required in future requests then at block 314 the reply is sent to proxy server 106, the reply indicating what additional information is required. On the other hand, if it is determined that the additional information will be required in future requests, then at block 312 the response message to be forwarded in block 314 will include information indicating that the additional information is required for all future requests. In alternative embodiments, the reply is sent to proxy server 106 via mobile telephone 150. In accordance with the invention, the reply that is sent at block 314 is in a format which is understandable by proxy server 106. This saves on any computation that mobile telephone 150 has to make at block 212 in order to create a request to send to proxy server 106. For example, the reply that is sent at block 314 may be in the form of a simple error message for example, standard sHTTP error message "409" which is understandable by proxy server 106. Referring to FIG. 2, in this case at block 212 mobile telephone 150 simply automatically forwards the reply from network server 114 to the proxy server 106 for processing.

Figure 4:
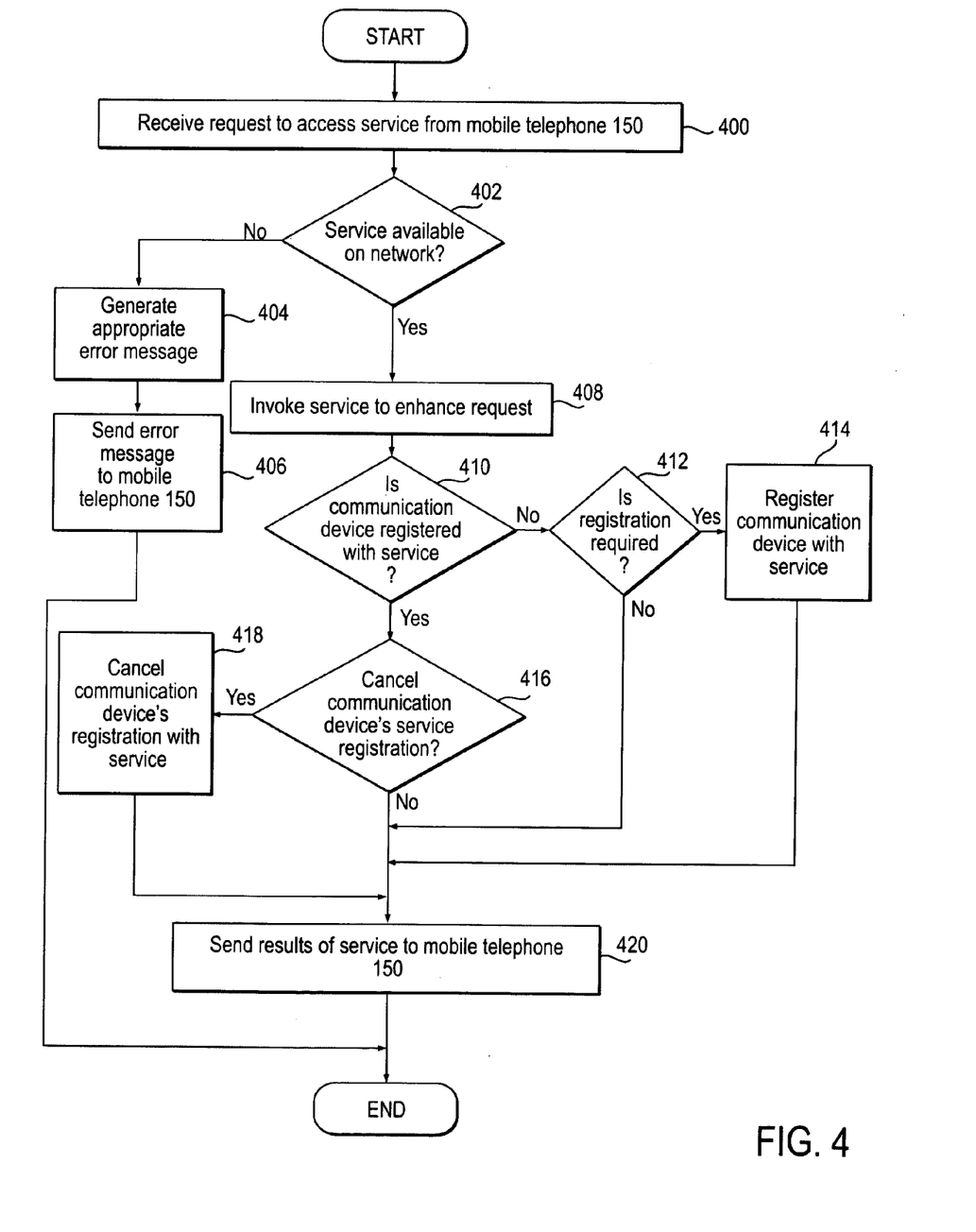
FIG. 4 illustrates an embodiment of a method performed by a proxy server in order to service a request by a communication device, in accordance with an embodiment of the invention.

The operations performed by proxy server 106 in accordance with the invention are shown in FIG. 4 of the drawings. Referring to FIG. 4, at block 400 proxy server 106 receives from network server 114, a request to access a particular proxy service. In alternative embodiments, proxy server 106 from mobile telephone 150, the request to access a particular proxy service. The proxy service may be a bookmarking service, a cookie caching service, a service to manage privacy agreements, a service to provide sub-id translations, a service to provide location or presence information, etc. At block 402, proxy server 106 determines whether the particular service requested is available on the network. If the service is not available then at block 404, an appropriate error message is generated and sent to mobile telephone 150 at block 406. If the requested service is available then the service is invoked by proxy server 106 at block 408.

At block 410 a determination is made as to whether the mobile telephone 150 is registered with the proxy service provided in block 408. If the mobile telephone 150 is not registered with the proxy service, then at block 412 the proxy server determines whether registration is required. If registration is required, at block 414, the proxy server 106 registers mobile telephone 150 with the proxy service. On the other hand, if at block 410 it is determined that the mobile telephone 150 is registered with the proxy service, then at block 416, a determination is made as to whether the mobile telephone's 150 registrations should be cancelled. If it is determined that mobile telephone's 150 registrations should be cancelled, then at block 418 the registration is cancelled. At block 420, the results obtained from the proxy service are sent in the form of a reply to mobile telephone 150.

Figure 5:
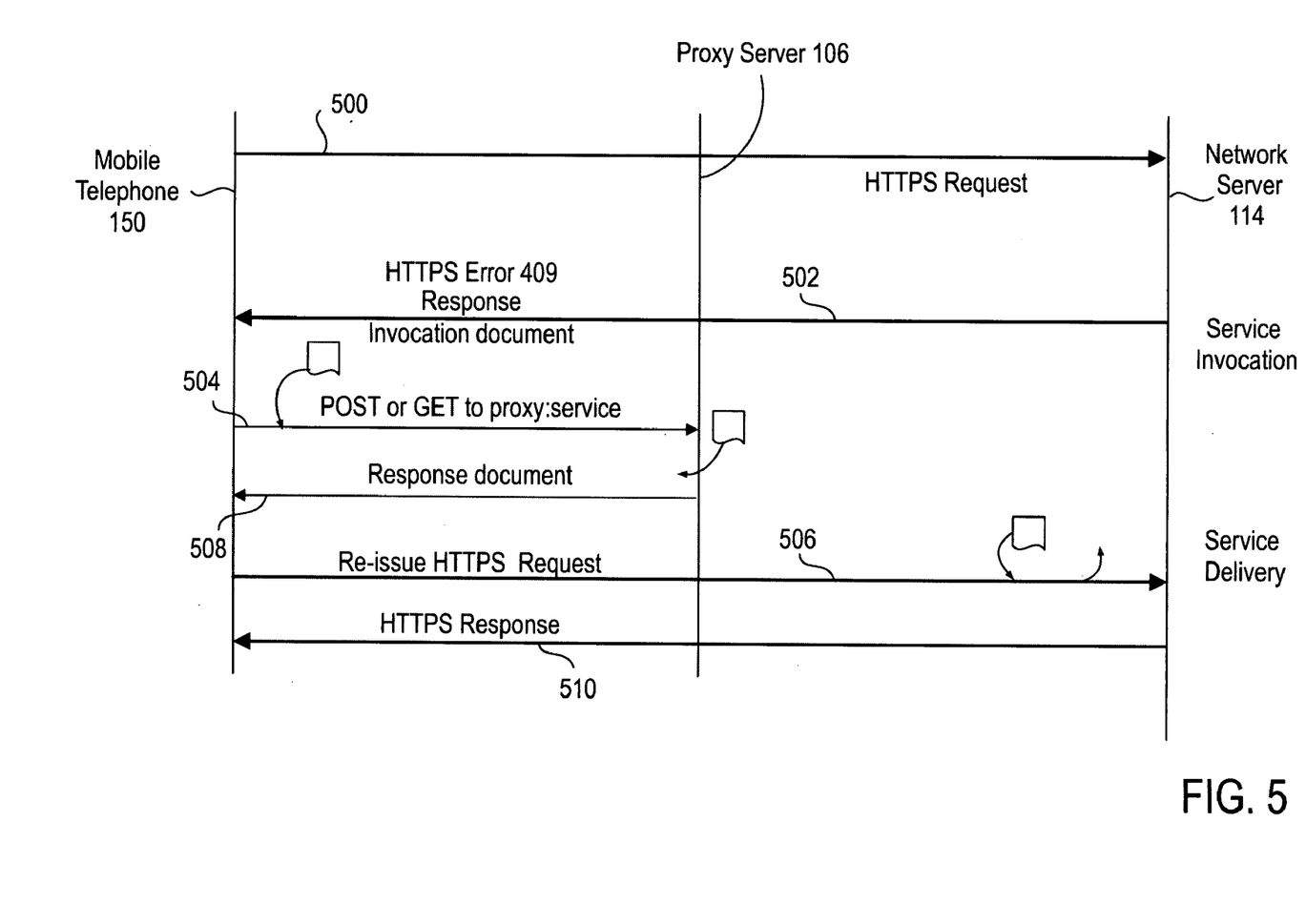
FIG. 5 is a schematic drawing of an example of an end-to-end communications flow between a communication device and a network server, in accordance with the invention.

FIG. 5 shows one example of an end-to-end communication flow between mobile telephone 150 and network server 114. Referring to FIG. 5, an initial communication 500 is sent to the network server 114 by mobile telephone 150 via a secure end-to-end connection established therewith in accordance with the methodology described with reference to FIG. 2. The communication 500 is in the form of a secure sHTTP request. If in order to service the request 500, the network server 114 requires enhanced or extended information, for example, location or presence information, etc., then network server 114 responds by sending an error message 502 back to mobile telephone 150. The error message 502 is a request for additional information by the network server 114 directed at the proxy server 106. The error message 502 may further include a request by the network server 114 to register mobile telephone 150 with the proxy based service. If the enhanced or extended information will be required in all future requests, then the error message 502 will include registration data related to the proxy service. As discussed, the error message 502 may be the standard HTTP error "409". Upon receipt of the error message 502, mobile telephone 150 sends a communication 504 to the proxy server 106 requesting processing of error message 502. If the registration data in the error message 502 provides, then proxy server 106 will register mobile telephone 150 with the proxy service. Proxy server 106 then services the request and sends a response document which includes the information required by network server 114 by way of a reply 506. Mobile telephone 150 receives the response document and reissues a HTTP request 508, via the secure connection to network server 114. Network server 114 services the request 508 and an HTTP reply 510 is sent back to the mobile telephone 150 via the secure end-to-end connection.

Figure 6A:
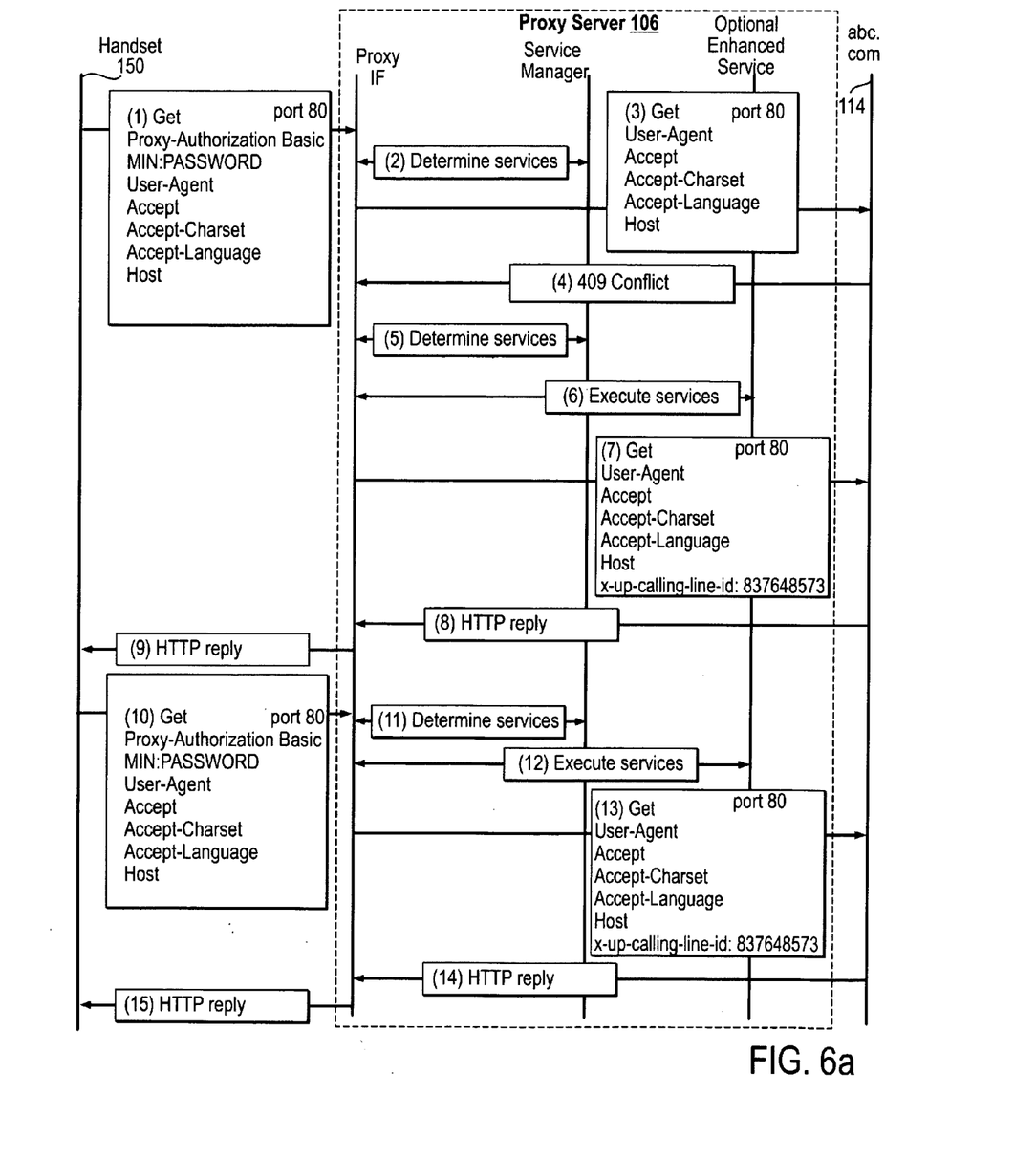
FIG. 6a illustrates registering with a proxy based service in a more detailed schematic drawing of the end-to-end communications flow shown in FIG. 5.

FIG. 6a of the drawings shows one example of an end-to-end communication flow of FIG. 5 in more detail. Referring to FIG. 6a, at block 1 an initial request is made to proxy server 106. The request may include, among other things, a proxy-authorization HTTP header, a number of mandatory headers (user-agent, user charset, etc.) and any number of optional headers. At block 2 the proxy server 106 examines the on-line service requested (e.g. URL) and checks it against a preprovisioned list of on-line services requiring additional information from a proxy service based at proxy server 106. In this example it is determined at block 2 that this on-line service does not require additional information from a proxy service. The proxy server 106 will then continue normal processing. At block 3 the request is issued to the network server 114. At block 4 the network server 114 responds with an HTTP response with status "409." The "409" response headers contain service invocation headers. The service invocation headers contain an indication that this proxy service should be applied for future requests to this network server 106. In one embodiment the network server 114 response at block 4 is returned to the mobile telephone 150. In an alternate embodiment, the network server 114 response at block 4 is returned to the proxy server 106.

At block 5 the proxy server 106 analyzes the invocation headers of block 4 to determine if a proxy service available at the proxy server 106 is required. If the proxy server determines that the proxy service is required for future requests to the network server 114 then the proxy server 106 records the registers the mobile telephone 150 with the proxy service. At block 6 proxy server 106 invokes the required proxy server based proxy service. Upon receiving the results of the proxy service, the proxy server 106 at block 7 re-issues the request including the proxy based service ("enhanced request") to the network server 114. At block 8 the network server 114 responds. The response is received at the proxy server 106. At block 9 the proxy server 106 forwards the response to the mobile telephone 150. In one embodiment the network server 114 responds directly to the mobile telephone 150 via a direct connection. In an alternate embodiment, the network server 114 responds to the mobile telephone 150 by way of the proxy server 106. In a further alternate embodiment, the network server 114 responds to the proxy server 106.

At block 10, the mobile telephone 150 issues another request to the same network server 114. Similar to block 2, block 11 the proxy server 106 examines the on-line service requested (e.g. URL) and checks it against a preprovisioned list of on-line services requiring additional information from a proxy service based at proxy server 106. In this case it determines that the service requested in block 5 needs to be applied. The proxy based service is invoked at block 12. At block 13 the enhanced request is issued to the network server 106. At block 14 the network server 114 responds to the enhanced request. It is important to note that the network server's 114 response, does not have to include a request to apply the proxy based service since it is automatically applied as a result of the block 5 registration. At block 15 the response is sent to the mobile telephone 150.

Figure 6B:
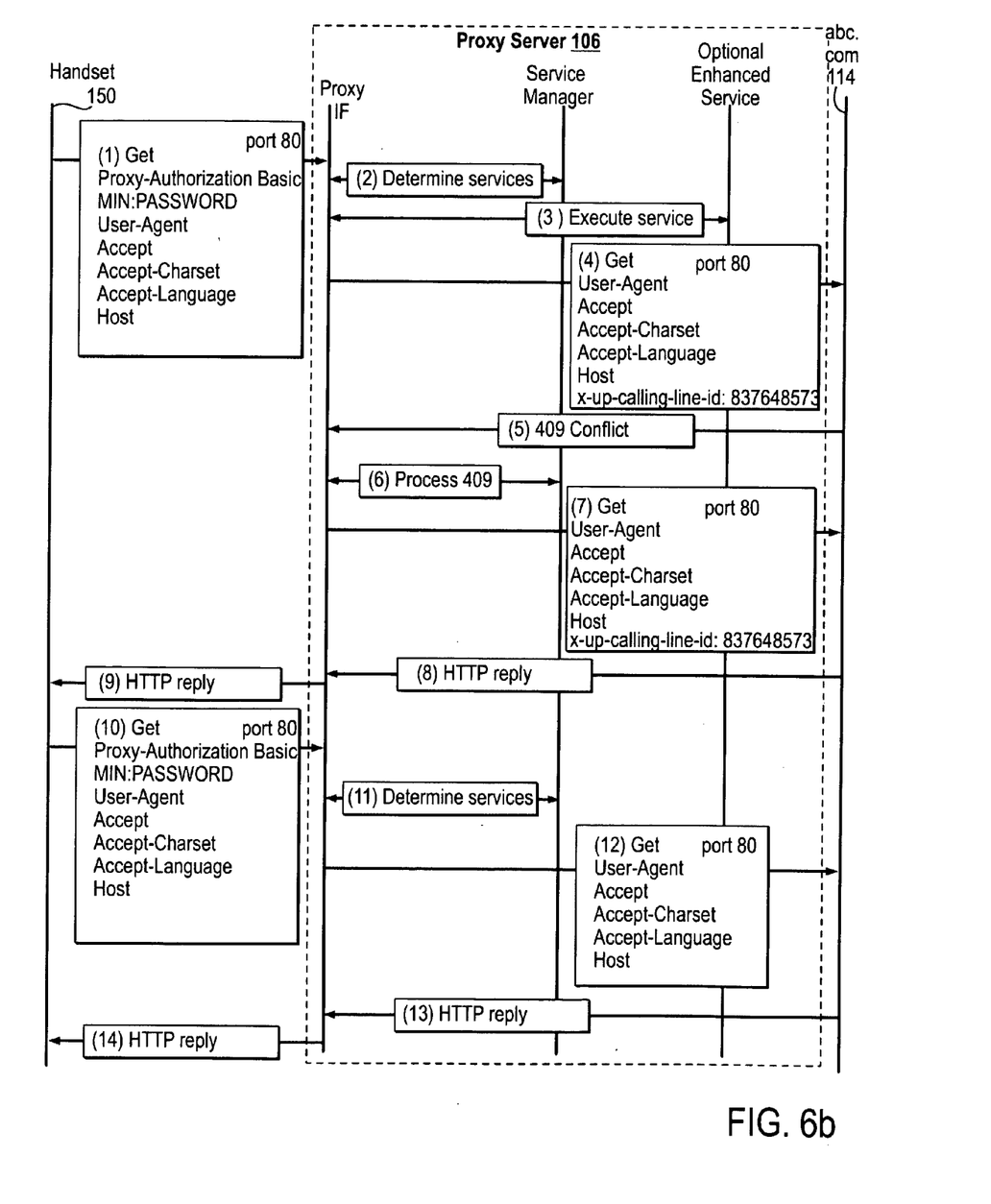
FIG. 6b illustrates unregistering a proxy based service in a more detailed schematic drawing of the end-to-end communication flow shown in FIG. 5.

FIG. 6b of the drawings shows another example of an end-to-end communication flow of FIG. 5 in more detail. Referring to FIG. 6b, at block 1 an initial request is made to proxy server 106. The request may include, among other things, a proxy-authorization HTTP header, a number of mandatory headers (user-agent, user charset, etc.) and any number of optional headers. At block 2 a the proxy server 106 examines the on-line service requested (e.g. URL) and checks it against a preprovisioned list of on-line services requiring additional information from a proxy service based at proxy server 106. In this example it is determined at block 2 that this on-line service does require additional information from a proxy service. The proxy server 106 determines that the proxy service must be executed before routing the enhanced request to towards the network server 114. At block 3 the proxy service is invoked. In this example, the proxy service enhances the request by adding the x-up-calling-line-id header to the request. At block 4 the request is issued to the network server 114. At block 5 the network server 114 responds with an HTTP response with status "409." The "409" response headers contain service invocation headers. The service invocation headers contain an indication that this application does not wish for future requests to be enhanced with the optional service.

At block 6 the proxy server 106 analyzes the invocation headers of block 5 and determines that the binding between the network server 114 and the proxy service is to be removed. That is, in block 6, the proxy server determines that the proxy service is to be unregistered for requests from the mobile telephone 150 to access the on-line service at the network server 114 for which the registration was initiated. At block 7 the proxy server 106 re-issues the request to the network server 114. At block 8 the network server 114 responds. The response is received at the proxy server 106.

At block 9 the proxy server 106 forwards the response to the mobile telephone 150. In one embodiment the network server 114 responds directly to the mobile telephone 150 via a direct connection (e.g. secure tunnel connection). In an alternate embodiment, the network server 114 responds to the mobile telephone 150 by way of the proxy server 106.

At block 10, the mobile telephone 150 issues another request to the same network server 114. Similar to block 2, block 11 the proxy server 106 examines the on-line service requested (e.g. URL) and checks it against a preprovisioned list of on-line services requiring additional information from a proxy service based at proxy server 106. In this case the proxy server 106 recognizes that the service requested in block 2 was unregistered in block 6. The request is issued to the network server 114 at block 12. At block 13 the network server 114 responds. At 14 the response is transmitted to the mobile telephone 150.

Figure 7:
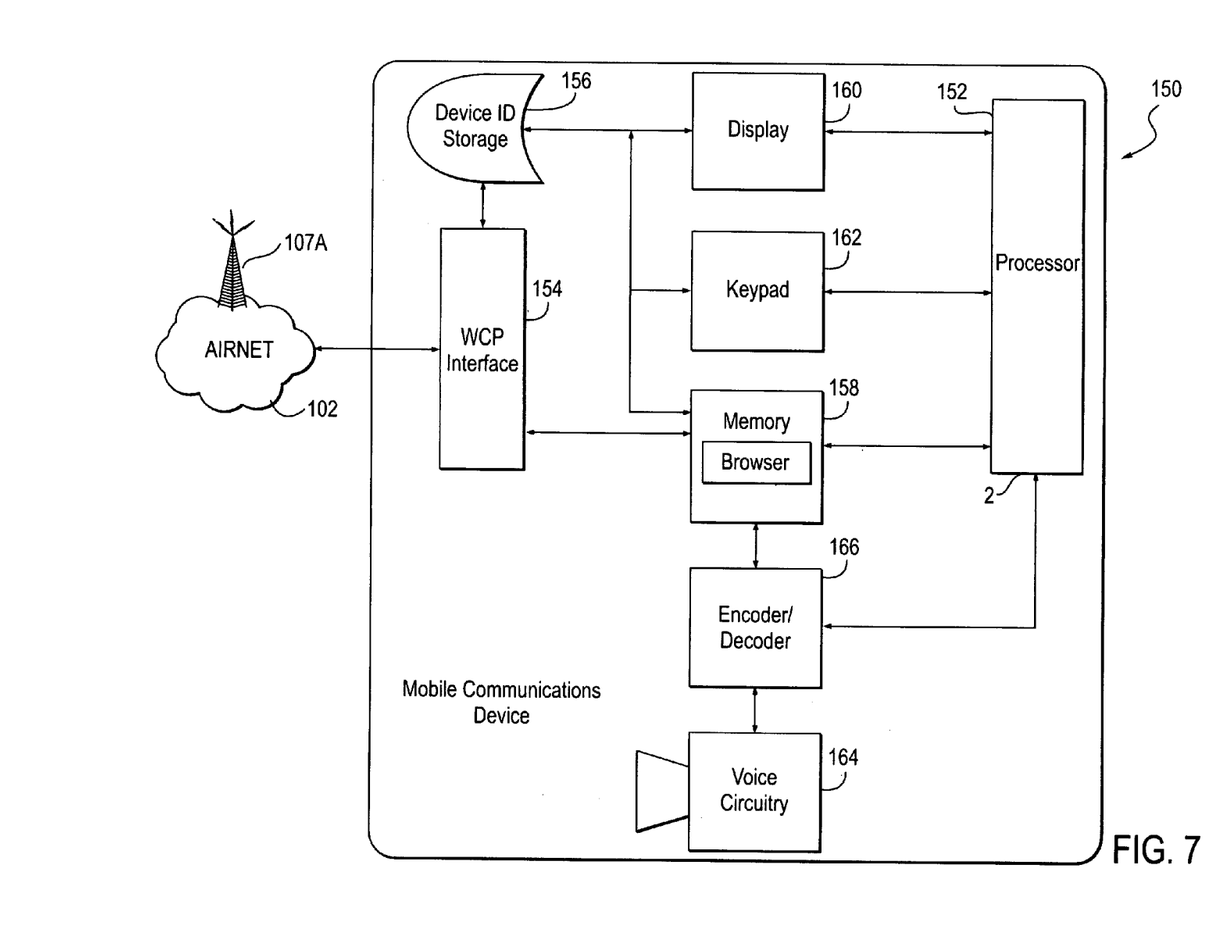
FIG. 7 is a block diagram of a mobile communication device in accordance with the invention.

Referring now to FIG. 7 of the drawings, the principle components of a mobile communication device in accordance with one embodiment of the invention, in the form of a mobile telephone 150, are shown schematically. The mobile telephone 150 includes a processor 152 which may be or include any of: a general-or-special purpose programmable microprocessor, Digital Signal Processor (DSP), Application Specific Integrated Circuits (ASIC), Programmable Logic Array (PLA), Field Programmable Gate Array (FBGA), etc., or a combination thereof. The mobile telephone 150 includes a Wireless Control Protocol (WCP) interface 154 that couples to a carrier network via airnet 102 to receive incoming and outgoing signals. Device identifier (ID) storage 156 stores and supplies to WCP interface 154 a device ID which identifies mobile telephone 150 to outside entities (e.g. proxy server 106). The device ID is a specific code that is associated with mobile telephone 150 and directly corresponds to the device in the user account typically provided in an associated proxy server device, such as proxy server 106.

In addition, mobile telephone 150 includes memory 158 that stores data and/or software for performing many of the processing tasks performed by the mobile device 150 when executed by the processor 152. These tasks include: establishing a communications session with proxy server 106 via a wireless link to airnet 102; establishing a secure communications session with the network server 114 by tunneling through proxy server 106; requesting and receiving data from network server 114 and from the proxy server 106 via the carrier network; and displaying information on a display. Hence, memory 158 may represent one or more physical memory devices, which may include any type of Random Access Memory (RAM), Read-Only Memory (ROM), (which may be programmable), flash memory, non-volatile mass storage device, or a combination of such memory devices. Memory device 158 is also coupled to WCP interface 154 for the establishment of the communications sessions with network server 114 and proxy server 106 as described above. Mobile telephone 150 further includes a display 160 and a keypad 162. Mobile telephone 150 also includes voice circuitry 164 for inputting and outputting audio, and an encoder/decoder 166 coupled between processor 152 and voice circuitry 164 for encoding and decoding audio signals.

Figure 8:
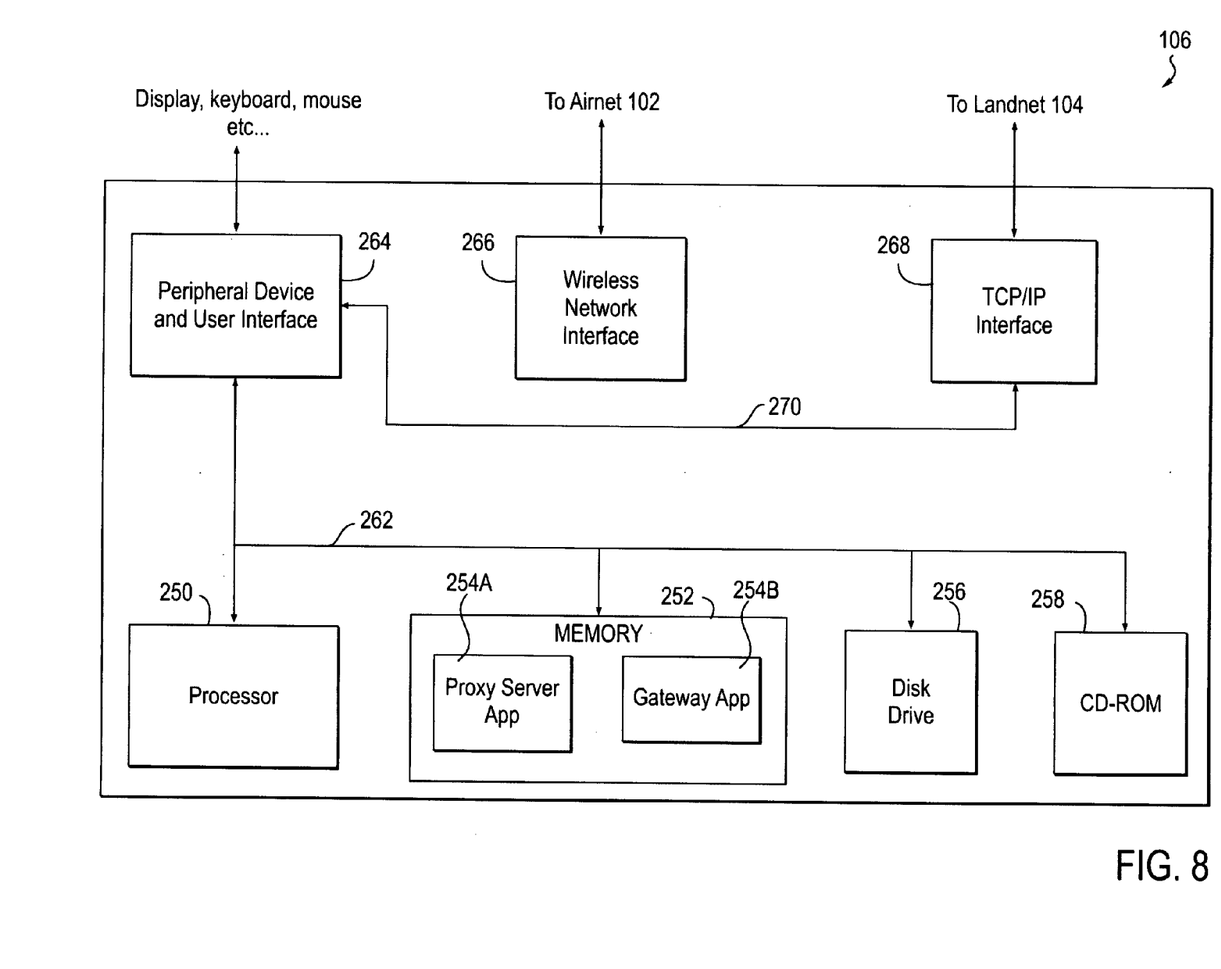
FIG. 8 is a block diagram of a proxy server in accordance with the invention.

Referring now to FIG. 8 of the drawings, reference numeral 106 generally indicates one embodiment of a proxy server in accordance with the invention. The proxy server 106 includes a memory device 252 which may represent one or more physical memory devices of the types described above with respect to mobile telephone 150. The proxy server 106 has loaded into the memory device 252 a proxy server application 254A and a gateway application 254B. The illustrated proxy server 106 further includes a disk drive 256, and a CD ROM drive 258 coupled to a peripheral device and user interface 264 via process bus 262. Processor 250, memory device 252, disk drive 256 and CD ROM 258 are generally known in the art.

The peripheral device and user interface 264 provides an interface between processor bus 262 and various components connected to a peripheral bus 270 as well as to user interface components such as display, keyboard, mouse, speakers, and other user interface devices. A wireless network interface 266, and landnet interface 268 are coupled to peripheral bus 270. Each of these interfaces 266, 268 may comprise a peripheral component card coupled to peripheral bus 270. The wireless network interface 266 couples proxy server 106 to airnet 102 illustrated in FIG. 1 of the drawings. The landnet interface 268 couples proxy server 106 to landnet 104 and operates according to the protocols as previously described. When executing program instructions written according to the principles of the present invention, proxy server 106 is able to perform the operations described in FIG. 3 of the drawings.

Figure 9:
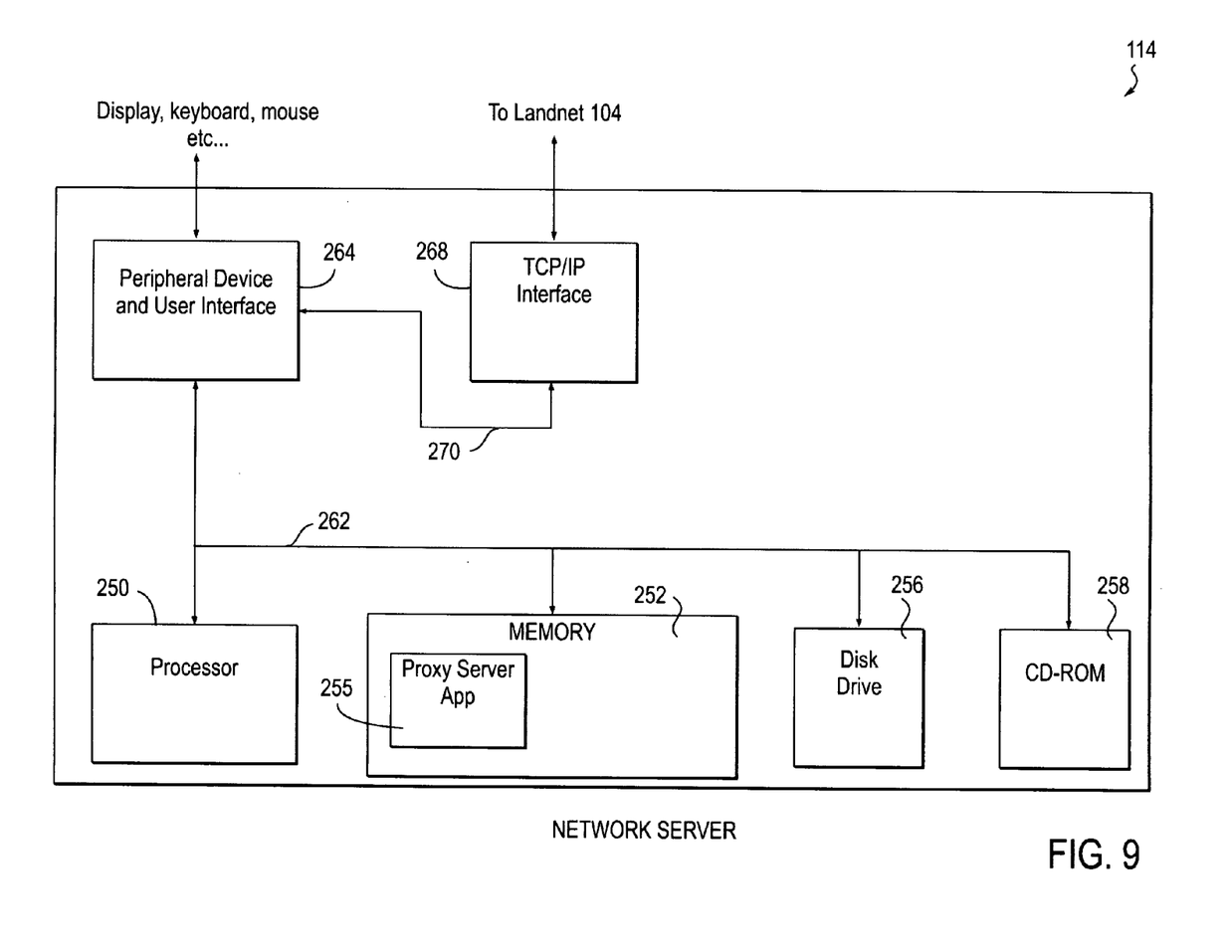
FIG. 9 is a block diagram of a network server in accordance with the invention.

Referring to FIG. 9 of the drawings, reference the numeral 114 generally indicates a network server 114 in accordance with another aspect of the invention. The network server 114 includes similar components to the proxy server 106 and accordingly the same reference numerals have been used to indicate the same or similar components. A principle difference between the network server 114 and proxy server 106 is that memory device 252 includes a set of instructions 255 which when executed by the processor causes the network server 114 to execute the methodology described with reference to FIG. 3 of the drawings. Furthermore, network server 114 does not have a wireless network interface.

In accordance with the method of the invention, various proxy services provided by a network carrier may be provisioned in a mobile communication device in accordance with the invention. Alternatively, the services may be discovered by the mobile communication device during a communications session with the proxy server 106 as described. This could be achieved by user a proxy: <service> URI scheme in which each additional service in the proxy would be identified by the <service> portion, for example, proxy: location. Alternatively, this could be done by using a single, proxy: URI scheme, for example proxy: service. Proxy server 106 will then be able to parse the incoming request from the mobile communication device and invoke the appropriate value added service.

In the foregoing detailed description, the method and apparatus of the present invention has been described with reference to specific exemplary embodiments thereof. It will, however, be evident that various modifications and changes may be made thereto without departing from the broader spirit and scope of the present invention. In particular, the separate blocks of the various block diagrams represent functional blocks of methods or apparatuses and are not necessarily indicative of physical or logical separations or of an order of operation inherent in the spirit and scope of the present invention. For example, the various blocks of FIG. 8 may be integrated into components, or may be subdivided into components. Similarly, the blocks of FIG. 2 (for example) represent portions of a method which, in some embodiments, may be reordered or may be organized in parallel rather than in a linear or step-wise fashion. The present specification and figures are accordingly to be regarded as illustrative rather than restrictive.

What is claimed is:

1. A method for automatically registering a communication device with a proxy server based service, the method comprising:
   receiving a first request from a communication device at a network server, the first request requesting access to an on-line service provided by the network server;
   determining that additional information is required from a proxy based service to service the first request;
   recognizing that the additional information will be required from the proxy based service to service a future request; and
   transmitting a second request from the network server to a proxy server, the second request requesting the required additional information and requesting that the communication device be registered with the proxy based service.

2. The method of claim 1 wherein transmitting a second request from the network server to a proxy server comprises transmitting the second request to the communication device, and the communication device forwarding the second request to the proxy server device.

3. The method of claim 2 wherein the second request includes an indication of the type of additional information that is required.

4. The method of claim 1 wherein requesting that the communication device be registered with the proxy based service includes providing the proxy server with registration data.

5. The method of claim 4 wherein the registration data comprises the identity of the proxy based service.

6. The method of claim 1 wherein the proxy server sends an error message to the communication device if the requested proxy service is not available.

7. The method of claim 1 wherein recognizing that the additional information will be required from the proxy based service to service a future request comprises the network server recognizing that the additional information is not available at the communication device.

8. The method of claim 7 wherein the network server further recognizes that the additional information is available through requests to the proxy based service.

9. The method of claim 1 wherein registering the communication device with the requested proxy based service comprises receiving permission from the communication device to register the communication device with the proxy based service.

10. The method of claim 1 further comprising registering the communication device with the requested proxy based service in response to the second request.

11. A method for requesting a communication device's permission to register the communication device with a proxy server based service, the method comprising:
   receiving a first request from a network server at a proxy server, the first request requesting that a communication device be registered with a proxy based service;
   determining that permission to register the communication device with the proxy based service is required; and
   requesting permission from the communication device to register the communication device with the proxy based service;
   wherein the first request is sent to the proxy server by the network server in response to the network server previously having:
      received a second request from the communication device, the second request requesting access to an on-line service provided by the network server;
      determined that additional information is required from the proxy based service to service the second request; and
      recognized that the additional information will be required from the proxy based service to service a future request.

12. The method of claim 11 further comprising registering the communication device with the requested proxy based service in response to a positive reply to said requesting permission.

13. A method for unregistering a communication device from a proxy server based service, the method comprising:
   receiving a first request from a communication device at a network server, the first request requesting access to an on-line service provided by the network server;
   recognizing that the first request includes additional information obtained from a proxy based service at a proxy server;
   determining that the additional information is not required in the first request;
   determining that the communication device should be unregistered from the proxy based service; and
   transmitting a second request from the network server to the proxy server, the second request requesting that the communication device be unregistered from the proxy based service.

14. The method of claim 13 further comprising unregistering the communication device from the proxy based service in response to the second request.

15. The method of claim 13 wherein requesting that the communication device be unregistered from the proxy based service comprises requesting the proxy server to resubmit a request by the communication device for access to the on-line service without additional information provided by the proxy based service.

16. The method of claim 13 wherein requesting that the communication device be unregistered from the proxy based service comprises identifying the proxy based service.

17. A machine readable storage medium having stored therein executable code which, when executed on a network server, causes the network server to perform a method for automatically registering a communication device with a proxy server based service, the method comprising:
   receiving a first request from the communication device at the network server, the first request requesting access to an on-line service provided by the network server;
   determining that additional information is required from the proxy based service to service the first request;
   recognizing that the additional information will be required from the proxy based service to service a future request; and
   transmitting a second request from the network server to a proxy server, the second request requesting the required additional information and requesting that the communication device be registered with the proxy based service.

18. A machine readable medium as in claim 17, wherein the communication device is registered with the requested proxy based service in response to the second request.

* * * * *